United States Patent
Durocher et al.

(10) Patent No.: US 9,279,341 B2
(45) Date of Patent: Mar. 8, 2016

(54) AIR SYSTEM ARCHITECTURE FOR A MID-TURBINE FRAME MODULE

(75) Inventors: Eric Durocher, Vercheres (CA); Pierre-Yves Legare, Chambly (CA); Alessandro Ciampa, Saint-Leonard (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 785 days.

(21) Appl. No.: 13/613,783

(22) Filed: Sep. 13, 2012

(65) Prior Publication Data

US 2013/0078080 A1 Mar. 28, 2013

Related U.S. Application Data

(60) Provisional application No. 61/537,764, filed on Sep. 22, 2011.

(51) Int. Cl.
*F01D 25/12* (2006.01)
*F01D 11/04* (2006.01)
*F01D 9/06* (2006.01)

(52) U.S. Cl.
CPC .............. *F01D 25/125* (2013.01); *F01D 9/065* (2013.01); *F01D 11/04* (2013.01); *Y02T 50/675* (2013.01)

(58) Field of Classification Search
CPC ......... F01D 25/125; F01D 25/12; F01D 9/06; F01D 9/065; F01D 11/04
USPC ......... 415/110, 111, 112, 142, 175, 176, 177, 415/180

See application file for complete search history.

(56) References Cited

U.S. PATENT DOCUMENTS

| | | |
|---|---|---|
| 3,261,587 A | 7/1966 | Rowley |
| 3,945,758 A | 3/1976 | Lee |
| 3,972,181 A | 8/1976 | Swayne |
| 4,292,008 A | 9/1981 | Grosjean et al. |
| 4,321,007 A | 3/1982 | Dennison et al. |
| 4,369,016 A | 1/1983 | Dennison |
| 4,435,958 A | 3/1984 | Klees |
| 4,448,019 A | 5/1984 | Klees |
| 4,462,204 A | 7/1984 | Hull |
| 4,553,901 A | 11/1985 | Laurello |
| 4,793,770 A | 12/1988 | Schonewald et al. |
| 4,807,433 A | 2/1989 | Maclin et al. |
| 4,820,116 A | 4/1989 | Hovan et al. |
| 4,979,872 A | 12/1990 | Myers et al. |
| 4,989,406 A | 2/1991 | Vdoviak et al. |
| 5,020,318 A | 6/1991 | Vdoviak |
| 5,160,251 A | 11/1992 | Ciokajlo |
| 5,167,484 A | 12/1992 | Ponziani et al. |

(Continued)

FOREIGN PATENT DOCUMENTS

EP     1193371     4/2003

*Primary Examiner* — Craig Kim
*Assistant Examiner* — Brian P Wolcott
(74) *Attorney, Agent, or Firm* — Norton Rose Fulbright Canada LLP

(57) ABSTRACT

A mid-turbine frame is disposed between high and low pressure turbine assemblies. A secondary air system is defined in the mid-turbine frame (MTF) to provide cooling to the turbine section of the engine. The secondary air system may be used to cool and pressurize seals to assist with oil retention in bearing cavities. The temperature gain of the secondary air may be reduced by flowing the secondary air through one or more external lines and then generally radially inwardly through air passages defined in the MTF.

15 Claims, 4 Drawing Sheets

(56) References Cited

U.S. PATENT DOCUMENTS

| | | | |
|---|---|---|---|
| 5,180,282 A | 1/1993 | Lenhart et al. | |
| 5,272,869 A | 12/1993 | Dawson et al. | |
| 5,273,397 A | 12/1993 | Czachor et al. | |
| 5,292,227 A | 3/1994 | Czachor et al. | |
| 5,438,756 A | 8/1995 | Halchak et al. | |
| 5,482,431 A * | 1/1996 | Taylor | 415/111 |
| 5,581,996 A | 12/1996 | Koch et al. | |
| 5,593,277 A | 1/1997 | Proctor et al. | |
| 5,630,703 A | 5/1997 | Hendley et al. | |
| 5,746,574 A | 5/1998 | Czachor et al. | |
| 5,806,303 A | 9/1998 | Johnson | |
| 5,809,772 A | 9/1998 | Giffin, III et al. | |
| 5,832,715 A | 11/1998 | Dev | |
| 5,867,980 A | 2/1999 | Bartos | |
| 5,941,683 A | 8/1999 | Ridyard et al. | |
| 5,996,331 A | 12/1999 | Palmer | |
| 6,035,627 A | 3/2000 | Liu | |
| 6,217,279 B1 * | 4/2001 | Ai et al. | 415/110 |
| 6,227,801 B1 | 5/2001 | Liu | |
| 6,351,938 B1 | 3/2002 | Kerrebrock | |
| 6,358,001 B1 | 3/2002 | Bosel et al. | |
| 6,431,820 B1 | 8/2002 | Beacock et al. | |
| 6,439,841 B1 | 8/2002 | Bosel | |
| 6,558,114 B1 | 5/2003 | Tapley et al. | |
| 6,578,362 B1 | 6/2003 | Coffinberry | |
| 6,585,482 B1 | 7/2003 | Liotta et al. | |
| 6,619,030 B1 | 9/2003 | Seda et al. | |
| 6,672,072 B1 | 1/2004 | Giffin, III | |
| 6,708,482 B2 | 3/2004 | Seda | |
| 6,763,652 B2 | 7/2004 | Baughman et al. | |
| 6,860,716 B2 | 3/2005 | Czachor et al. | |
| 6,902,371 B2 | 6/2005 | Anderson, Jr. et al. | |
| 6,916,151 B2 | 7/2005 | Judet et al. | |
| 6,981,841 B2 | 1/2006 | Krammer et al. | |
| 7,048,496 B2 | 5/2006 | Proctor et al. | |
| 7,063,505 B2 | 6/2006 | Czachor | |
| 7,124,572 B2 * | 10/2006 | Aycock et al. | 60/39.511 |
| 7,210,899 B2 | 5/2007 | Wilson, Jr. | |
| 7,266,941 B2 | 9/2007 | Eleftheriou et al. | |
| 7,334,392 B2 | 2/2008 | Moniz et al. | |
| 7,383,686 B2 * | 6/2008 | Aycock et al. | 60/782 |
| 7,673,461 B2 | 3/2010 | Cameriano et al. | |
| 7,743,613 B2 * | 6/2010 | Lee et al. | 60/782 |
| 7,802,962 B2 | 9/2010 | Sjoqvist | |
| 7,870,742 B2 | 1/2011 | Lee et al. | |
| 7,926,289 B2 | 4/2011 | Lee et al. | |
| 8,099,962 B2 | 1/2012 | Durocher et al. | |
| 8,162,593 B2 | 4/2012 | Guimbard et al. | |
| 8,182,205 B2 | 5/2012 | Caruso et al. | |
| 2006/0288686 A1 | 12/2006 | Cherry et al. | |
| 2007/0025837 A1 | 2/2007 | Pezzetti, Jr. et al. | |
| 2008/0112791 A1 | 5/2008 | Lee et al. | |
| 2008/0112793 A1 | 5/2008 | Lee et al. | |
| 2008/0112795 A1 | 5/2008 | Lee et al. | |
| 2008/0112797 A1 * | 5/2008 | Seitzer et al. | 415/116 |
| 2010/0132369 A1 * | 6/2010 | Durocher et al. | 60/796 |
| 2010/0135770 A1 | 6/2010 | Durocher et al. | |
| 2010/0303608 A1 | 12/2010 | Kataoka et al. | |
| 2010/0303610 A1 * | 12/2010 | Wang et al. | 415/115 |
| 2011/0030386 A1 | 2/2011 | Kumar et al. | |
| 2011/0030387 A1 | 2/2011 | Kumar et al. | |
| 2011/0079019 A1 | 4/2011 | Durocher et al. | |
| 2011/0079020 A1 | 4/2011 | Durocher et al. | |

* cited by examiner

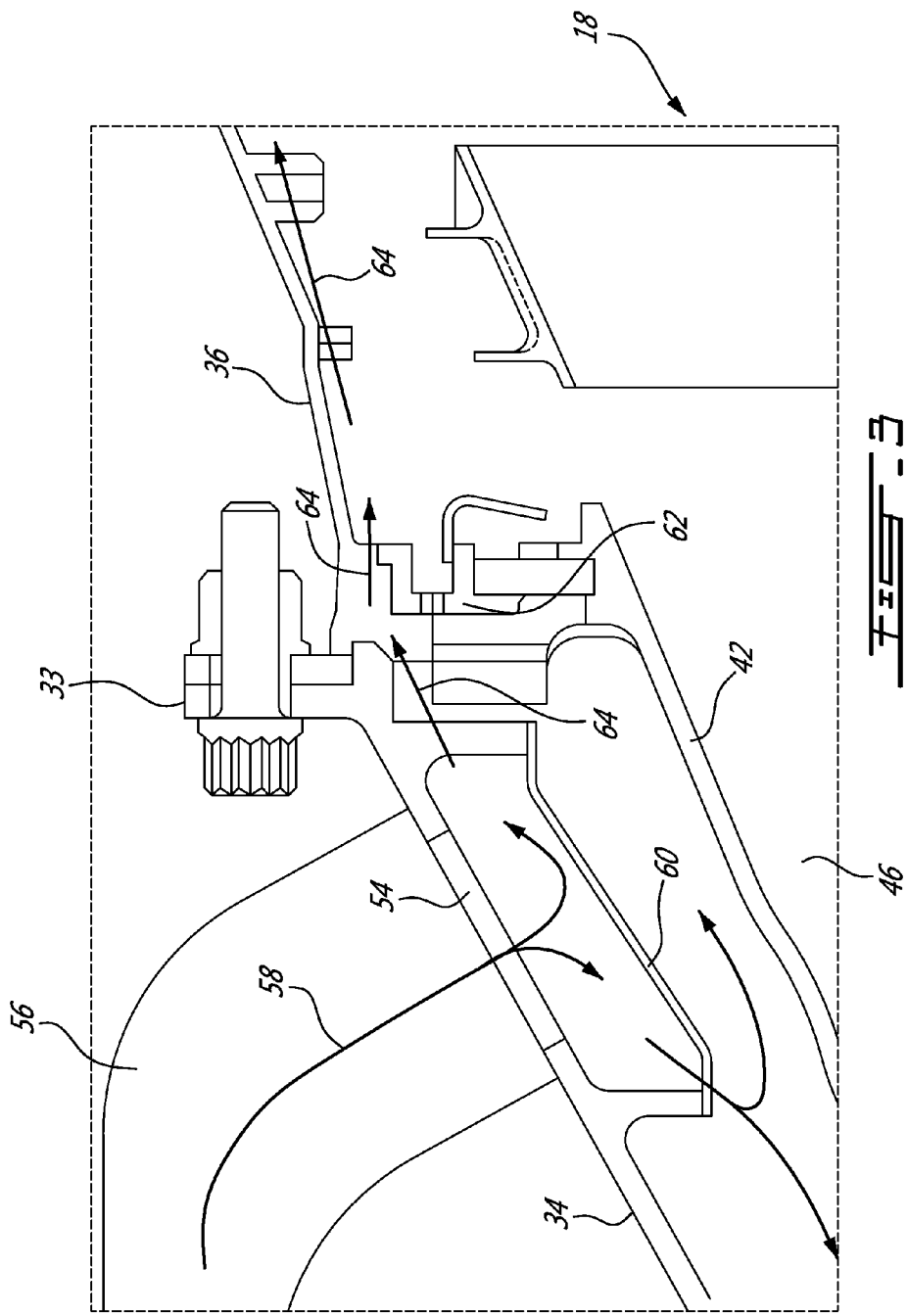

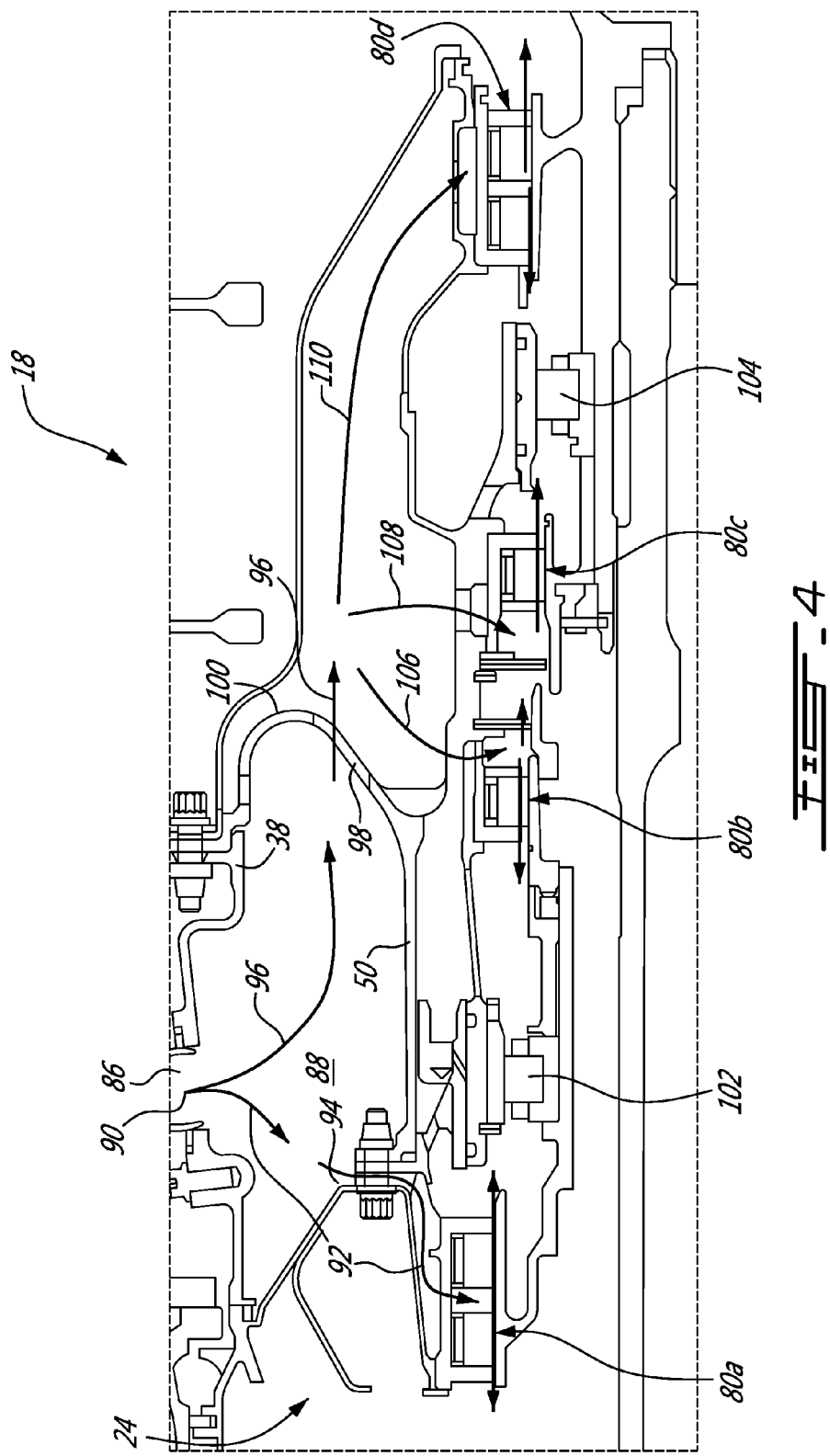

_US 9,279,341 B2_

AIR SYSTEM ARCHITECTURE FOR A MID-TURBINE FRAME MODULE

CROSS-REFERENCE TO RELATED APPLICATIONS

The present application claims priority on U.S. Provisional Application No. 61/537,764, filed on Sep. 22, 2011 the entire content of which is incorporated herein by reference.

TECHNICAL FIELD

The application relates generally to gas turbine engines and, more particularly, to an air system for a mid-turbine frame module of a gas turbine engine.

BACKGROUND OF THE ART

It is known to provide a mid-turbine frame assembly between high and low pressure turbine (HPT and LPT) rotor assemblies to support bearings and to transfer loads radially outwardly to a core engine casing. The mid-turbine frame assembly typically comprises a mid-turbine frame supporting an annular inter-turbine duct therein. The inter-turbine duct is defined between outer and inner duct walls which are interconnected by a plurality of radial hollow struts, thereby forming an annular hot gas path to convey the working fluid from the HPT to the LPT. The inter-turbine duct and the hollow struts are subjected to high temperatures and therefore cooling air is introduced around the inter-turbine duct and into the hollow struts to cool the same. Secondary air is also used to pressurize and cool the bearings supported by the mid-turbine frame assembly. In conventional cooling air systems for mid-turbine frames, the cooling air is fed to the mid-turbine frame centrally through the LP shaft. As the air travels through the shaft, the air picks up heat. As a result, the air available for cooling and pressuring the seals of the bearings is not as cool as it could be. This may have a detrimental effect on the integrity and durability of the bearing seals. It also imposes constraints on the types of seal that can be used in the turbine section of the engine.

There is thus room for improvement.

SUMMARY

In one aspect, there is provided an air system architecture to connect turbine components, such as bearing seals, to a source of pressurized cooling air. The air system architecture is configured to minimize heat pick up as the pressurized cooling air travels from a source of pressurized air to its point of application. The system allows providing cooler secondary air to the hot turbine section of the gas turbine engine. According to one embodiment, the air travels externally of the engine core, radially inwardly through a mid-turbine frame and into a bearing housing mounted inside of the mid-turbine frame. An air cooler may be provided for cooling the air prior to directing it into the bearing housing.

In a second aspect, there is provided a gas turbine engine comprising first and second axially spaced-apart turbine rotor assemblies mounted for rotation on bearings housed in a bearing housing, the bearings having seals to restrict lubricant leakage from the bearing housing, and a mid-turbine frame disposed axially between the first and second rotor assemblies, the mid-turbine frame having structurally interconnected radially outer and inner cases, the bearing housing being mounted to the radially inner case of the mid-turbine frame and being disposed radially inwardly of the mid-turbine frame, said mid-turbine frame having a first air system for pressurizing and cooling the seals of the bearings in the bearing housing, said first air system comprising at least one air inlet defined in the radially outer case of said mid-turbine frame for receiving pressurized cooling air from at least one first external line disposed outside of a core casing of the engine where engine temperatures are lower, and a cooling air passage extending from said air inlet radially inwardly through said mid-turbine frame to said bearing housing.

In accordance with a still further general aspect, there is provided a gas turbine engine comprising: a high pressure turbine (HPT) rotor assembly; a low pressure turbine (LPT) rotor assembly; a mid-turbine frame disposed axially between the HPT rotor assembly and the LPT rotor assembly, the mid-turbine frame comprising a radially outer case, a radially inner case and an inter-turbine duct between the radially outer and radially inner cases, the inter-turbine duct defining a gas path for directing hot gases from the HPT rotor assembly to the LPT rotor assembly, said inter-turbine duct including a set of circumferentially hollow struts extending radially across said gas path; a first secondary air system including at least one first air inlet defined in the radially outer case of the mid-turbine frame, at least one internal pipe connected in fluid flow communication with said at least one first air inlet and extending radially inwardly through a corresponding one of said hollow struts, and a first plenum disposed radially inwardly relative to said radially inner case, said first plenum being connected in fluid flow communication with said at least one internal pipe and with a bearing housing of said HPT and LPT rotor assemblies; and a second secondary air system comprising at least one second air inlet defined in said radially outer case of said mid-turbine frame, a second plenum defined between said radially outer case and said inter-turbine duct, said second plenum being connected in fluid flow communication with said at least one second air inlet, a third plenum defined between the inter-turbine duct and the radially inner case, the third plenum being connected in fluid flow communication with said second plenum via said hollow struts, and wherein said third plenum is connected in fluid flow communication with said HPT and LPT rotor assemblies.

DESCRIPTION OF THE DRAWINGS

Reference is now made to the accompanying figures, in which:

FIG. 3 is an enlarged cross-section view of the parts contained in box 3-3 of FIG. 2; and FIG. 4 is an enlarged cross-section view of the parts contained in box 4-4 of FIG. 2.

DETAILED DESCRIPTION OF THE PREFERRED EMBODIMENTS

Figure 1:
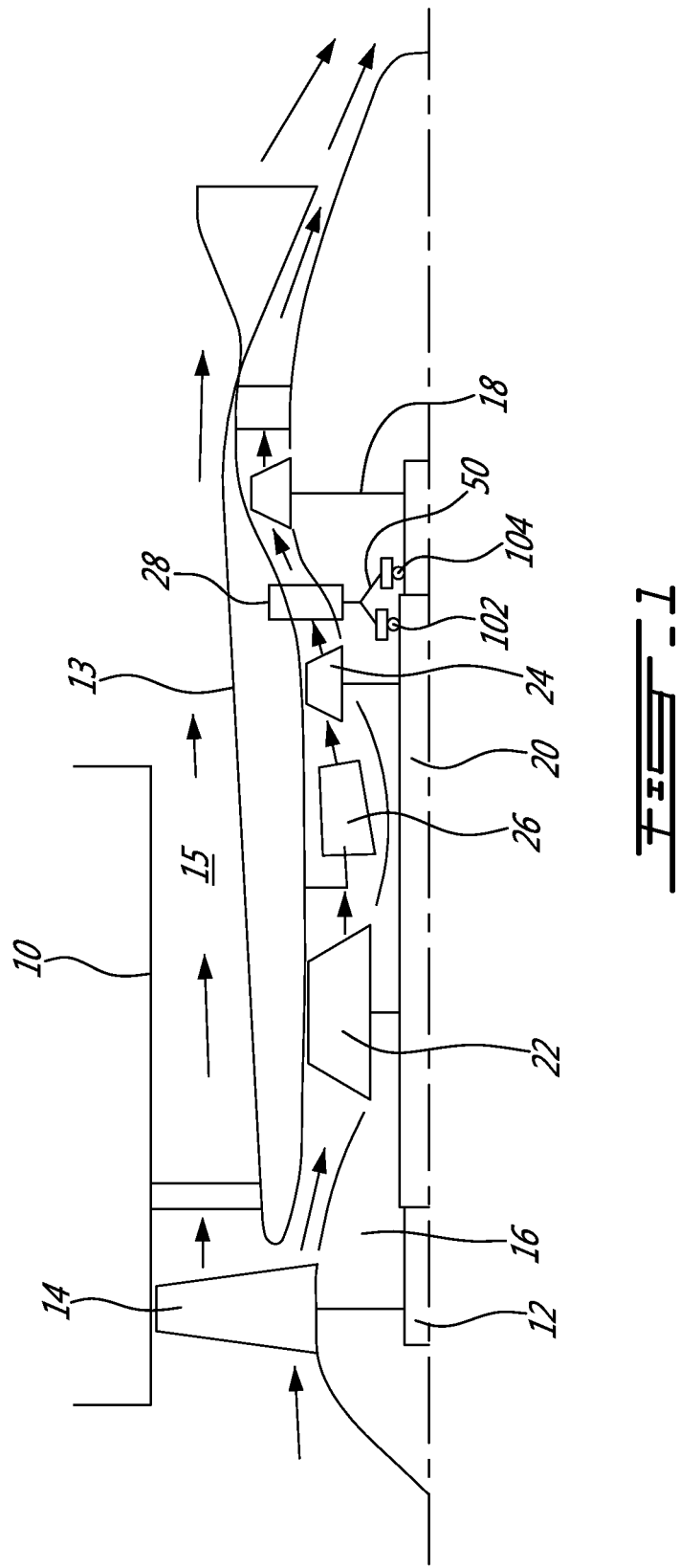
FIG. 1 is a schematic cross-sectional view of a turbofan gas turbine engine.

Referring to FIG. 1, an exemplary turbofan gas turbine engine includes a fan case 10, a core case 13, an air by-pass 15 between the fan case and the core case 13, a low pressure (LP) spool assembly which includes a fan assembly 14, a LP compressor assembly 16 and a LP turbine assembly 18 connected by a LP shaft 12, and a high pressure (HP) spool assembly which includes a HP compressor assembly 22 and a HP turbine assembly 24 connected by a HP shaft 20. The core casing 13 surrounds the low and high pressure spool assemblies to define a main fluid path therethrough. In the main fluid path, there is provided a combustor 26 to generate combustion gases to power the HP turbine assembly 24 and the LP turbine assembly 18. A mid-turbine frame assembly 28 is disposed between the HP turbine assembly 24 and the LP turbine assembly 18 and supports a bearing housing 50 containing for example #4 and #5 bearings 102 and 104 around the respective shafts 20 and 12. The terms "axial" and "radial" used for various components below are defined with respect to the main engine axis shown but not numbered in FIG. 1.

Figure 2:
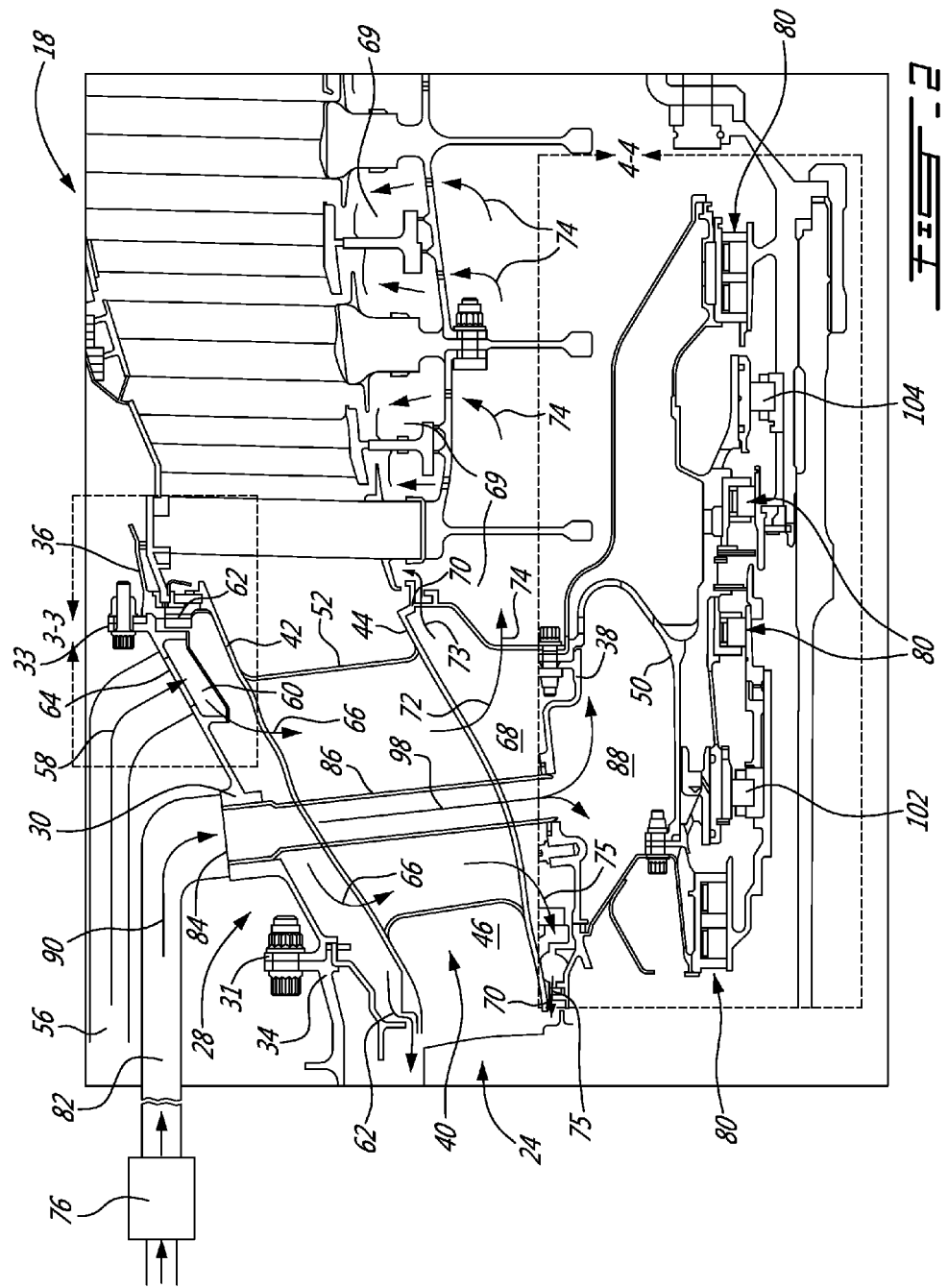
FIG. 2 is a cross-sectional view of the a mid-turbine frame disposed between a high pressure turbine assembly and a low pressure turbine assembly of the engine shown in FIG. 1.

As shown in FIG. 2, the mid-turbine frame (MTF) 28 may comprise an annular outer case 30 which has forward and aft mounting flanges 31, 33 at both ends with mounting holes therethrough for connection to the HP turbine case 34 and the LP turbine case 36. The outer case 30, the HP and the LP turbine cases 34, 36 may form part of the core casing 13 schematically depicted in FIG. 1. The MTF 28 may further comprise an annular inner case 38 concentrically disposed within the outer case 30. A plurality of load transfer spokes (not shown) may extend radially between the outer case 30 and the inner case 38. The inner case 38 supports the bearing housing 50 (schematically shown in FIG. 1). The bearing housing 50 may be bolted or otherwise suitably mounted to the inner case 38. The loads from the bearings 102 and 104 are transferred to the core casing 13 through the MTF 28.

The MTF 28 may be further provided with an inter-turbine duct (ITD) 40 for directing combustion gases to flow generally axially through the MTF 28. The ITD 40 has an annular outer duct wall 42 and an annular inner duct wall 44. An annular path 46 is defined between the outer and inner duct walls 42, 44 to direct the combustion gas flow from the HP turbine 24 to the LP turbine 18. An array of circumferentially spaced-apart hollow struts 52 may extend radially through path 46 between the outer and inner duct walls 42 and 44. The load transfer spokes may extend through the struts 52. The struts 52 may have an airfoil profile to act as turbine vanes for properly directing the combustion gases to the LP turbine 18. As shown in FIG. 2, the struts 52 may be open-ended.

As depicted by the arrows in FIGS. 2 to 4, first and second secondary air systems may be integrated to the MTF 28 for supplying compressed air through the turbine section of the engine for non-propulsion purposes. For instance, the secondary air may be used for cooling and sealing purposes. The arrows in FIGS. 2 to 4 represent air flow directions. The air of the first system may be used to cool and pressurized the bearing housing 50 whereas the second system may be used to cool the inter-turbine duct, and the LP and HP turbine assemblies.

According to the illustrated embodiment, the second air system may comprise a number of inlet ports 54 defined in the outer case 30 of the MTF 28, the inlet ports 54 being connected to respective external lines 56 which are, in turn, connected to a common source of compressed air, such as compressor bleed air (e.g. P2.8 air or P2.9 air). According to one embodiment, four inlet ports 54 and four external lines 56 are distributed around the outer case 30. The external lines 56 are located outside of the core casing 13 where engine temperatures are lower. For instance, the external lines 56 may be disposed between the engine by-pass 15 and the engine core. As shown by arrows 58 in FIG. 3, the air is discharged from the external lines 56 through the inlet ports 54 into a first plenum 60 defined between the outer case 30 and the outer duct wall 42. Forward and aft sealing rings 62 are provided to minimize air leakage from the plenum 60. The plenum 60 provides for a uniform distribution of pressurized cooling air all around the inter-turbine duct, thereby avoiding local air impingement on the struts 52, which could potentially lead to hot spots and durability issues. The air directed in plenum 60 ensures proper cooling of the inter-turbine duct 40. As shown by arrows 64 in FIG. 3, a portion of the air received in the plenum 60 flows in a downstream direction through channels defined between the outer case 30 and the LPT case 36 to pressurize and provide cooling to the latter. More particularly, the air 64 is used to cool and pressurize the outer shroud structure of the LPT 18. As shown in FIG. 1, another portion of the air leaks through the forward sealing ring 62 to pressurize and cool the outer shroud structure of the HP turbine 24. The major portion of the air however flows from the first plenum 60 radially inwardly through the hollow struts 52, as depicted by arrows 66 in FIG. 2. The air is discharged from the struts 52 into a second plenum 68 defined between the inner duct wall 44 and the inner case 38 of the MTF 28. Forward and aft ring seals 70 are provided to minimize air leakage from the second plenum 68. The back wall of the plenum 68 may be defined by a baffle 72 extending radially from the inner duct wall 44 to the inner case 38. Openings are defined in the baffle 72 to allow air to flow in a generally downstream direction from the second plenum 68 to the LPT rotor front cavities 69 to pressurize same and provide cooling to LPT rotor drums, as depicted by arrow 74 in FIG. 2. As shown by arrow 73, an amount of pressurized air is also allowed to leak from the plenum 68 at an interface of aft sealing ring 70 into the front cavity 69 of the first stage LPT rotor. The air 73 and 74 directed in cavities 69 is supplied at a pressure greater than the pressure of the gas path, thereby preventing hot gas ingestion. As depicted by arrow 75, an amount of air also flows forwardly out from plenum 68 to provide a proper pressure delta at sealing ring 70 while at the same time contributing to the pressurizing of the HPT rear cavity.

As shown in FIG. 2, the other air system may comprise an air cooler 76 connected to a source of compressor bleed air (e.g. P2.8 air or P2.9 air) for providing cooled compressed air to carbon seals 80 used to provide oil retention in bearing cavities of bearing housing 50. The air cooler 76 may be positioned at various locations in the engine. For instance, the air cooler may be provided outside of the engine core. External lines 82 may be provided for connecting the outlet of the air cooler 76 to inlet ports 84 defined in the outer case 30 of the MTF 28. According to one embodiment, two circumferentially spaced-apart inlet ports 84 are provided in the outer case 30. Each port 84 is connected to its own external line 82. Lines 82 may be disposed between the engine by-pass and the engine core. A corresponding number of internal pipes 86 are disposed in corresponding struts 52 for directing the cooled compressed air from the inlet ports 84 into a third plenum 88 defined between the inner case 38 and the bearing housing 50. As can be appreciated from FIG. 2, the internal pipe 86 extends radially through the second plenum 68 to deliver the second flow of air directly into the third plenum 88. As shown by arrows 90, the air flows from the external lines 82 through pipe 86 into plenum 88.

Referring to FIG. 4, it can be appreciated that a first portion 92 of the cooled compressed air directed into plenum 88 flows through a baffle 94 into the bearing housing to cool and pressurize the front carbon seals 80a of #4 bearing 102 and, thus, avoid oil leakage in the HPT rear cavity. The remaining portion 96 of the air directed in plenum 88 flows through flow calibrating holes 98 defined in a rear structural member 100 of the bearing housing 50 to provide cooling air to seals 80b, 80c and 80d. More specifically, as shown by arrow 106, a first portion of air 96 is used to cool and pressurize the rear seals 80b of #4 bearing 102. A second portion 108 is used to cool and pressurize the front seals 80c of #5 bearing 104. Finally, a third portion 110 is used to cool and pressurize the rear seals 80d of #5 bearing 104. Seals 80b and 80c may each comprise a carbon seal and a brush seal.

The above described air flow scheme allows to provide cooler air to the seals 80a, 80b, 80c and 80d of bearings 102 and 104. The air picks up less heat as it travels from the source of air to the points of application, as compared to conventional secondary air systems. Providing cooler air to the bearing seals contributes to ensure seal integrity by avoiding thermally induced seal distortions. The reliability and durability of the seals can thus be improved. Supplying cooled compressed air to bearings 80 also provides for the use of carbon seals instead of axial face seals which is advantageous from a cost and weight point of view. Providing better cooling to the seals 80 and to the bearing housing 50 also allows the engine to be operated at higher temperatures which is advantageous from an engine performance point of view. Cooler air temperature environment surrounding bearing compartment also provides opportunities to select conventional materials (e.g.: Stainless steel) rather than high temperature resistant materials (e.g.: Nickel alloy) which is considered a cost saving advantage.

The above description is meant to be exemplary only, and one skilled in the art will recognize that changes may be made to the embodiments described without departing from the scope of the invention disclosed. For example, the MTF and system and the bearing housing may have a different structural configuration that the one described above and shown in the drawings. Still other modifications which fall within the scope of the present invention will be apparent to those skilled in the art, in light of a review of this disclosure, and such modifications are intended to fall within the appended claims.

What is claimed is:

1. A gas turbine engine comprising first and second axially spaced-apart turbine rotor assemblies mounted for rotation on bearings housed in a bearing housing, the bearings having seals to restrict lubricant leakage from the bearing housing, and a mid-turbine frame disposed axially between the first and second rotor assemblies, the mid-turbine frame having structurally interconnected radially outer and inner cases, the bearing housing being mounted to the radially inner case of the mid-turbine frame and being disposed radially inwardly of the mid-turbine frame, said mid-turbine frame having a first air system for pressurizing and cooling the seals of the bearings in the bearing housing, said first air system comprising at least one air inlet defined in the radially outer case of said mid-turbine frame for receiving pressurized cooling air from at least one first external line disposed outside of a core casing of the engine where engine temperatures are lower, and a cooling air passage extending from said air inlet radially inwardly through said mid-turbine frame to said bearing housing, said cooling air passage comprising an inner plenum bounded at a front axial end thereof by a baffle configured to direct a first portion of the pressurized cooling air to a first front seal of said seals of the bearings, the inner plenum being bounded at a rear axial end thereof by a wall through which flow calibrating holes are defined, the flow calibrating holes being in flow communication with an enclosed space which is in turn in fluid flow communication with at least two other seals of the bearings.

2. The gas turbine engine defined in claim 1, wherein the first air system further comprises an air cooler for cooling the air prior to directing the same into the bearing housing.

3. The gas turbine engine defined in claim 1, wherein the mid-turbine frame further comprises an inter-turbine duct disposed between the radially outer case and the radially inner case, the inter-turbine duct having inner and outer annular walls and an array of circumferentially spaced-apart struts extending radially between the inner and outer annular walls, the inner and outer annular walls defining a hot gas path therebetween for directing hot gases from the first turbine rotor assembly to the second turbine rotor assembly, and wherein the cooling air passage comprises at least one internal pipe extending from said air inlet radially inwardly through at least a corresponding one of said struts.

4. The gas turbine engine defined in claim 3, wherein the inner plenum is defined between the inner case and the bearing housing, the at least one internal pipe directing the pressurized cooling air into said plenum.

5. The gas turbine engine defined in claim 3, wherein said mid-turbine frame has a second air system integrated thereto, said second air system comprising at least one second air inlet defined in said radially outer case of the mid-turbine frame, an outer plenum defined between the radially outer case and the outer annular wall of the inter-turbine duct, the outer plenum being connected in fluid flow communication with said at least one second air inlet for receiving pressurized cooling air therefrom, an intermediate plenum defined between the radially inner case and the inner annular wall of the inter-turbine duct, said outer and intermediate plenums being connected in fluid flow communication through at least one of said struts, and wherein said intermediate plenum is connected in fluid flow communication with both said first and second turbine rotor assemblies.

6. The gas turbine engine defined in claim 5, wherein the at least one internal pipe of the first air system extends through the outer and intermediate plenums of the second air system, and wherein the pressurized cooling air flowing through the second air system flows over said at least one internal pipe as it travels from said outer plenum to said intermrnediate plenum.

7. The gas turbine engine defined in claim 5, wherein said at least one internal pipe of the first air system extends through said at least one of said struts connecting the outer and intermediate plenums of the second air system.

8. The gas turbine engine defined in claim 5, wherein said at least one second air inlet is connected in fluid flow communication to at least one corresponding second external line.

9. The gas turbine engine defined in claim 8, wherein said at least one first and second external lines are disposed radially outwardly relative to the mid-turbine frame and extend outwardly therefrom to a source of compressor bleed air.

10. The gas turbine engine defined in claim 2, wherein the air cooler is mounted outside of the mid-turbine frame in said at least one first external line.

11. The gas turbine engine defined in claim 3, wherein the internal pipe has an outlet end connected to a port in said radially inner case, and wherein said port constitutes an inlet of the inner plenum.

12. A gas turbine engine comprising: a high pressure turbine (HPT) rotor assembly; a low pressure turbine (LPT) rotor assembly; a mid-turbine frame disposed axially between the HPT rotor assembly and the LPT rotor assembly, the mid-turbine frame comprising a radially outer case, a radially inner case and an inter-turbine duct between the radially outer and radially inner cases, the inter-turbine duct defining a gas path for directing hot gases from the HPT rotor assembly to the LPT rotor assembly, said inter-turbine duct including a set of circumferentially hollow struts extending radially across said gas path; a first secondary air system including at least one first air inlet defined in the radially outer case of the mid-turbine frame, at least one internal pipe connected in fluid flow communication with said at least one first air inlet and extending radially inwardly through a corresponding one of said hollow struts, and a first plenum disposed radially inwardly relative to said radially inner case, said first plenum being connected in fluid flow communication with said at least one internal pipe and with a bearing housing of said HPT and LPT rotor assemblies; and a second secondary air system comprising at least one second air inlet defined in said radially outer case of said mid-turbine frame, a second plenum defined between said radially outer case and said inter-turbine duct, said second plenum being connected in fluid flow communication with said at least one second air inlet, a third plenum defined between the inter-turbine duct and the radially inner case, the third plenum being connected in fluid flow communication with said second plenum via said hollow struts, and wherein said third plenum is connected in fluid flow communication with a rotor rear cavity of the HPT rotor assembly and a rotor front cavity of the LPT rotor assembly.

13. The gas turbine engine defined in claim 12, wherein the at least one first and second air inlets are connected to a source of pressurized cooling air via respective external supply lines disposed radially outwardly of a core case of the engine.

14. The gas turbine engine defined in claim 12, wherein the first secondary air system comprises an air cooler disposed upstream of the at least one first air inlet.

15. The gas turbine engine defined in claim 12, wherein a back wall of the third plenum includes a baffle defining openings to allow air to flow in a generally downstream direction from the third plenum to the rotor front cavity of the LPT rotor assembly.

\* \* \* \* \*